United States Patent Office.

ERASTUS B. SAMPLE AND JOHN SPARKS, OF BROOKLYN, NEW YORK.

Letters Patent No. 96,621, dated November 9, 1869.

IMPROVEMENT IN MAKING TOY-TORPEDOES.

The Schedule referred to in these Letters Patent and making part of the same.

*To all to whom it may concern:*

We, ERASTUS B. SAMPLE and JOHN SPARKS, of the city of Brooklyn, county of Kings, and State of New York, have invented a certain Process of Making a New and Improved Hand Toy-Torpedo, of which the following is a specification.

Take of amorpheous phosphorus, or red phosphorus, about ten one-hundredths, and of chlorate of potash sixty one-hundredths, or thereabout, and of pulverized sulphur about fifteen one-hundredths, and of common chalk about fifteen one-hundredths, which, when put together, water is added sufficient to make it a thick paste. This forms the fulminating-powder.

Then we add plaster of Paris about ten times the amount or quantity of the fulminating-powder, as follows:

We take a piece of tin-foil, or any other metal foil, or any other material that will contain the mixture, of the required size, then we place about one-half of the required quantity of plaster of Paris in the tin-foil, or other covering, and then the required quantity, above described, of fulminating-powder we place in the plaster of Paris, and then we cover the same with the other half of the required quantity of plaster of Paris, and then we twist the tin-foil or other covering around the mixture very tight; then we lay the torpedo, thus made, in a warm and dry place for a few hours, to dry.

We claim the metal-foil covering, and the mode of combining the fulminating-powder with the plaster of Paris, substantially as described, thereby producing a safe, reliable, and cheap hand toy-torpedo.

ERASTUS B. SAMPLE.
JOHN SPARKS.

Witnesses:
JOSEPH J. YATES,
J. L. HUTTON.